US012770487B2

(12) United States Patent
Grisey et al.

(10) Patent No.: US 12,770,487 B2
(45) Date of Patent: Oct. 20, 2026

(54) METHOD FOR MONITORING A CHILD PRESENT IN THE PASSENGER COMPARTMENT OF A MOTOR VEHICLE

(71) Applicant: Continental Automotive Technologies GmbH, Hannover (DE)

(72) Inventors: Christophe Grisey, Colomiers (FR); Isabelle Bacaer, Cornebarrieu (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 19/055,610

(22) Filed: Feb. 18, 2025

(65) Prior Publication Data

US 2025/0336278 A1 Oct. 30, 2025

(30) Foreign Application Priority Data

Apr. 25, 2024 (FR) ....................................... 2404303

(51) Int. Cl.
*G08B 21/02* (2006.01)
*B60R 16/023* (2006.01)
(Continued)

(52) U.S. Cl.
CPC ...... *G08B 21/0202* (2013.01); *B60R 16/0231* (2013.01); *G01S 13/56* (2013.01); *G01S 13/886* (2013.01)

(58) Field of Classification Search
CPC ............ G08B 21/0202; B60R 16/0231; A61G 2203/32; A61G 7/012; A61G 2203/726
See application file for complete search history.

(56) References Cited

U.S. PATENT DOCUMENTS 10,467,877 B1 11/2019 Elyakim et al.
11,462,092 B2 * 10/2022 Sadolfo ................. G08B 21/22
(Continued)

FOREIGN PATENT DOCUMENTS

EP 3783579 A1 2/2021

OTHER PUBLICATIONS

Euro NCAP, "European New Car Assessment Programme (Euro NCAP)"—Test and Assessment Protocol—Child Presence Detection, Version1.2, Dec. 5, 2023. (26 pages).
(Continued)

*Primary Examiner* — Sisay Yacob
(74) *Attorney, Agent, or Firm* — Buchanan Ingersoll & Rooney PC

(57) ABSTRACT

The invention relates to a method for monitoring a child (2B) implemented by a child monitoring system (50), comprising an electronic control unit (510) and a motion detection module (520), comprising the following steps of:

activating a motion detection module (520) and a first timer expiring at the end of a first predetermined duration;

the electronic control unit (510) sending a warning message if the motion detection module (520) detects a movement of the child (2B), with said warning message being sent via the antenna module (10) to the communication device (2A-1) of the user (2A);

reactivating the presence detection system (40) when said first timer has expired if no movement of the child (2B) is detected by the motion detection module (50) during the first predetermined duration.

15 Claims, 2 Drawing Sheets

(51) Int. Cl.
*G01S 13/56* (2006.01)
*G01S 13/88* (2006.01)

(56) References Cited

U.S. PATENT DOCUMENTS

| | | | |
|---|---|---|---|
| 11,872,957 B2 | 1/2024 | Herbert et al. | |
| 2013/0307684 A1 | 11/2013 | Pallotta | |
| 2020/0058210 A1* | 2/2020 | Williams | B60N 2/0024 |
| 2021/0056827 A1* | 2/2021 | Klamt | A61B 5/024 |
| 2021/0366263 A1* | 11/2021 | Clemmons-Trigueros | B60N 2/267 |

OTHER PUBLICATIONS

Preliminary Research Report with machine translation dated Oct. 14, 2024, by the French Patent Office in corresponding French Patent Application No. FR2404303. (17 pages).

* cited by examiner

METHOD FOR MONITORING A CHILD PRESENT IN THE PASSENGER COMPARTMENT OF A MOTOR VEHICLE

CROSS REFERENCE TO RELATED APPLICATIONS

This application claims priority to French Patent Application No. 2404303, filed Apr. 25, 2024, the contents of such application being incorporated by reference herein.

DESCRIPTION

Field of the Invention

The present invention relates to the field of motor vehicles and more specifically relates to a device for monitoring a child asleep in a motor vehicle.

Background of the Invention

Safety standards in the field of motor vehicles progress from year to year to ensure the safety of vehicle users, both drivers and passengers alike.

Notably, safety standards concerning children have become more specific, in order to increase protection and reduce accidents. Thus, child seat devices have evolved enormously to become more reliable and safer in the event of an accident, through their design, the materials used and the way they are secured.

However, these technical solutions do not cover more passive safety problems, such as cases where children, notably very young children, are unintentionally left in the passenger compartment of the vehicle by an adult.

These cases can have dramatic consequences, particularly in hot weather, when the vehicle is exposed to sunlight and the temperature in the passenger compartment rises rapidly. If forgotten by an adult, the consequences for the health of young children can be very serious.

As a result, the standards are evolving in order to take these risks into account, notably in the Euro-NCAP ("European New Car Assessment Programme") standard, incorporated herein by reference. Thus, vehicles must have a set of functions and actions in terms of systems for detecting the presence of children in order to avoid these incidents.

These systems reduce the risk of forgetting a child in the passenger compartment. However, there are situations where an adult may consciously wish to leave a child in the vehicle, for example, for a quick errand or even to refuel. Thus, the systems must be able to avoid triggering warnings or strategies specific to forgetting a child in this type of situation.

Therefore, these systems make provision for exceptions as a function of the distance of the adult from the vehicle and/or the time spent outside the vehicle.

An example of an existing system is provided in patent application EP 3783579 A1, incorporated herein by reference.

However, these systems do not currently take into account the case whereby an adult would wish to voluntarily leave a child in a vehicle for a longer duration. For example, in the case of a child who has fallen asleep in the vehicle at the end of a journey, an adult may wish to leave the child sleeping in the vehicle without the risk of waking the child or activating an alarm.

Therefore, a simple, reliable and effective solution for at least partly overcoming these disadvantages would be advantageous.

SUMMARY OF THE INVENTION

To this end, an aspect of the invention firstly relates to a method for monitoring a child present in the passenger compartment of a motor vehicle, said vehicle comprising an antenna module, a communication network, a presence detection system and a child monitoring system, said antenna module being configured to communicate with a communication device of a user of the vehicle over a wireless communication link, said child monitoring system comprising an electronic control unit and a motion detection module configured to detect a movement of the child, said electronic control unit being configured to communicate with the motion detection module, the antenna module and the presence detection system via said communication network, said method comprising the following steps of:

- placing the vehicle on standby;
- the presence detection system detecting a child in the passenger compartment after it has been placed on standby;
- the user deactivating the presence detection system via the electronic control unit;
- the electronic control unit activating, following the deactivation of the presence detection system, the motion detection module and a first timer expiring at the end of a first predetermined duration;
- the electronic control unit sending a warning message if the motion detection module detects a movement of the child, with said warning message being sent via the antenna module to the communication device of the user, activating a second timer expiring at the end of a second predetermined duration and reactivating the presence detection system when said second timer has expired or deactivating the motion detection module when the user returns to the vehicle;
- reactivating the presence detection system when said first timer has expired if no movement of the child is detected by the motion detection module during the first predetermined duration.

The method according to an aspect of the invention therefore allows the presence detection system of the vehicle to be placed on voluntary standby, while monitoring the sleeping child and warning the user if they wake up. The monitoring is carried out by detecting movements in relation to a reference situation, and the movements taken into account can indicate that the child is waking up, such as broad gestures, or, on the contrary, that they are still sleeping, such as constant breathing in relation to the reference situation. The timers allow the presence detection system to be reactivated if the user does not return to the vehicle quickly enough after receiving a warning message, or if the child remains motionless for too long. The timers can be set by the user to suit their needs. Therefore, the child can continue to sleep and the different probabilities are covered by the child monitoring system, which also ensures continuity with the presence detection system when the child sleeps for too long.

Preferably, the method comprises, before the step of deactivating the presence detection system, a step of activating the monitoring system that is carried out on the command of the user, preferably following a prior request sent to the electronic control unit via a user interface of the vehicle by the user. Once the presence detection system detects that a child is present in the vehicle when the vehicle is stationary, a warning message is sent over the user interface to the user, who can thus choose whether or not to activate the child monitoring system, as under certain conditions they may not wish to leave the child in the vehicle even if the child is asleep.

Activating the child monitoring system corresponds to the electronic control unit receiving an activation signal from the user interface.

Advantageously, the method comprises an intermediate step of the electronic control unit confirming the waking of the child after detecting a movement of the child, and the step of sending a warning message is only triggered if the child whose movement has been detected is confirmed as being awake. Indeed, the child may move while asleep and trigger a premature warning message. This confirmation step is notably based on training the electronic control unit to integrate the sleeping habits of the child, notably their breathing rate, which allows the movements corresponding to an awake state to be effectively distinguished.

Preferably, the return of the user corresponds to the opening of the doors of the vehicle, or even the unlocking of the vehicle if it was locked by the user, or even the approach of the user at a predetermined distance from the vehicle.

In addition or alternatively, the method comprises a step involving the electronic control unit sending a distance message to the communication device of the user when the user moves beyond a dedicated monitoring area, defined by a predetermined distance from the vehicle.

An aspect of the invention also relates to an electronic control unit for a motor vehicle, said vehicle comprising a presence detection system, a communication network and a motion detection module, said electronic control unit comprising a memory zone and being configured to communicate via the communication network, said electronic control unit also being configured to deactivate the presence detection system, activate the motion detection module, send a warning message, activate at least one timer and reactivate the presence detection system. This electronic control unit allows the monitoring method as described above to be implemented.

In one embodiment, the electronic control unit is also configured to receive a signal for activating the monitoring system from a user interface of the vehicle via the communication network.

Additionally or alternatively, the electronic control unit is also configured to confirm that the child whose movements are detected by the motion detection module is awake. The electronic control unit thus can be trained to distinguish movements corresponding to an awake state, notably a difference in the breathing rate between wakefulness and sleep, and can implement, for example, machine-learning techniques for this training. Thus, the electronic control unit can determine, for example, that a sudden movement by the child is a movement that the child is making in their sleep if their breathing rate corresponds to a sleeping state, and not send a message to the device of the user.

Advantageously, the electronic control unit is also configured to detect the opening of a door of the vehicle and to interpret said opening of a door as the return of a user, or even the unlocking of the vehicle or even the approach of the user at a sufficient distance from the vehicle.

In addition or alternatively, the electronic control unit is configured to detect the distance between the vehicle and the user, to compare it with a predetermined maximum distance and to send a distance message, via the antenna module and the wireless communication link, to the communication device of the user when the user moves beyond the predetermined distance from the vehicle.

An aspect of the invention also relates to a child monitoring system for a vehicle, comprising an electronic control unit as described, a communication network and a motion detection module.

Preferably, the motion detection module of the child monitoring system comprises at least one radio frequency signal transceiver device, of the RADAR type, that transmits radio frequency signals and records the signals originating from the reflection of the transmitted radio frequency signals on the surfaces on the inside of the vehicle.

Even more preferably, the radio frequency signal transceiver device of the detection module transmits a signal of the UWB (Ultra-WideBand) type, which has a penetration depth in certain materials, notably fabrics, which allows, for example, movements to be detected through a sheet or a blanket that could cover the sleeping child, and thus respiratory movements to be better detected.

An aspect of the invention also relates to a vehicle comprising a child monitoring system as described, a presence detection system, an antenna module configured to communicate with a communication device of a user of the vehicle over a communication link and a communication network.

Advantageously, the vehicle also comprises an intrusion detection system, configured to detect the intrusion of a third party into the vehicle, and the child monitoring system is configured to communicate with said intrusion detection system so that the child left in the vehicle is not considered to be an intruder during monitoring.

BRIEF DESCRIPTION OF THE DRAWINGS

Further features and advantages of aspects of the invention will become more clearly apparent upon reading the following description. This description is purely illustrative and should be read with reference to the appended drawings, in which.

DETAILED DESCRIPTION OF EXEMPLARY EMBODIMENTS

Figure 1:
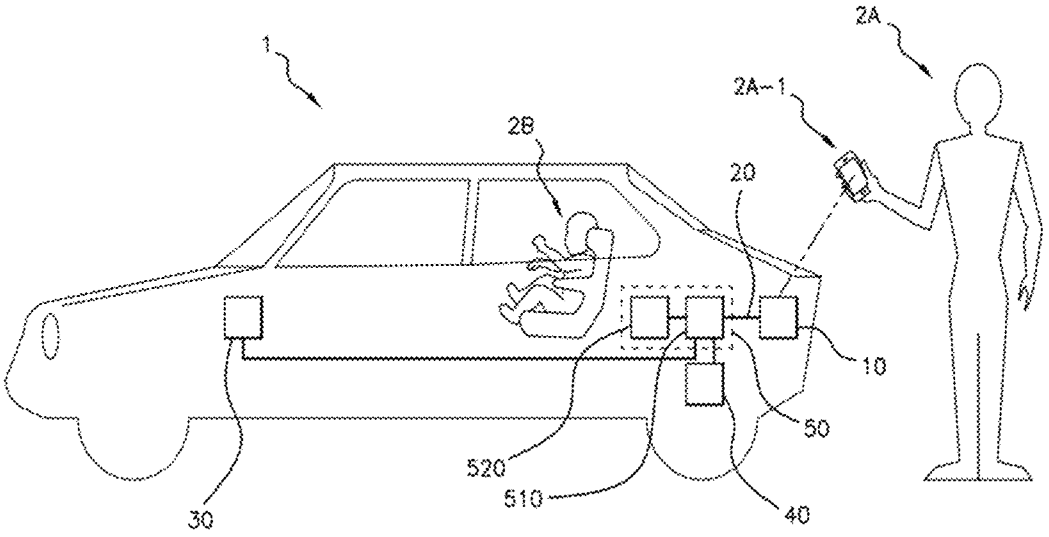
FIG. 1 schematically illustrates a vehicle in which a user has left a child and which comprises a child monitoring system configured to implement the method according to an aspect of the invention.
Figure 2:
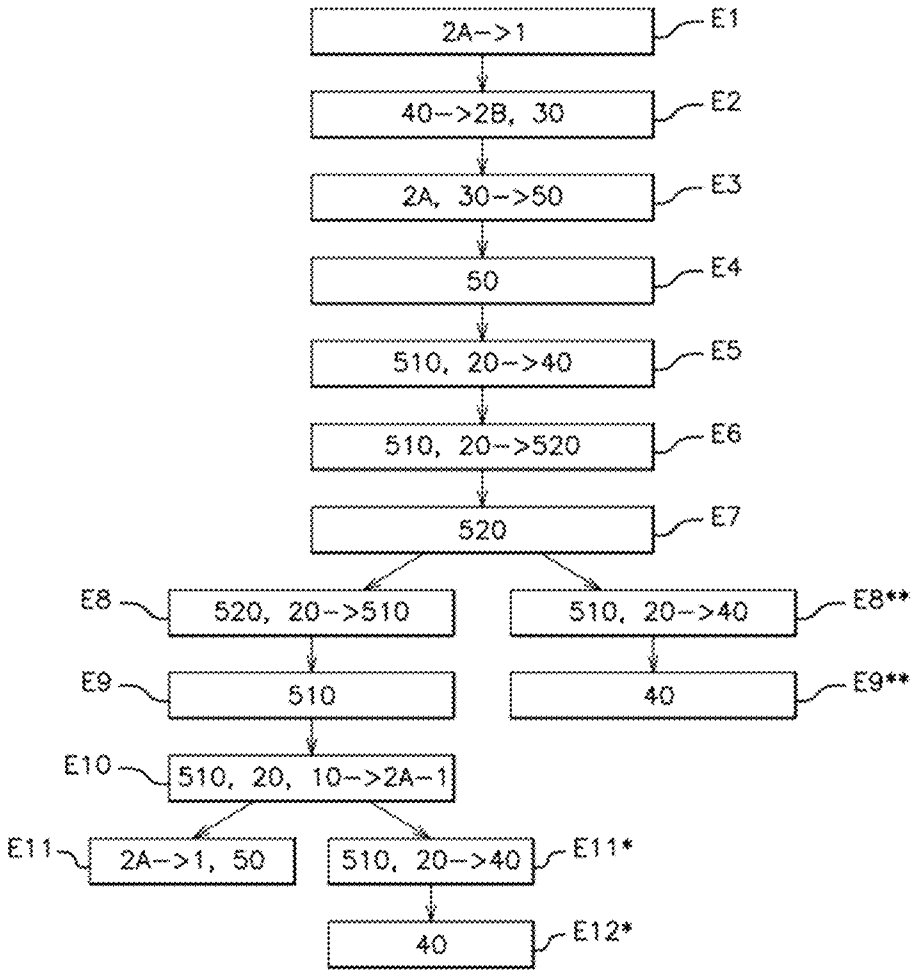
FIG. 2 schematically illustrates the sequence of the method for monitoring a child present in the passenger compartment of a motor vehicle.

As shown in FIG. 1, the method according to an aspect of the invention is implemented when a user 2A, provided with a communication device 2A-1, wishes to leave a child 2B asleep in a vehicle 1 while moving away from the vehicle 1.

Vehicle 1

The vehicle 1 comprises an antenna module 10, a communication network 20, a user interface 30, a presence detection system 40 and a child monitoring system 50.

Antenna Module 10

The antenna module 10 allows communication over a wireless communication link between various systems of the vehicle 1 and the communication device 2A-1 of the user 2A. Notably, it allows communication between the communication device 2A-1 and the child monitoring system 50.

The wireless communication link is implemented by exchanging radio frequency signals between the antenna module 10 and the communication device 2A-1, such as Ultra-WideBand (UWB) or Bluetooth Low Energy (BLE) signals, in a manner known per se.

Communication Network 20

The communication network 20 of the vehicle 1 allows electrical signals to be exchanged via a wired network inside the vehicle 1.

The communication network 20 can be a wired network of the CAN (Control Area Network) type.

User Interface 30

The user interface 30 is configured to receive commands from the user 2A and to display information intended for the user 2A.

The user interface 30 is connected to the communication network 20.

Presence Detection System 40

The presence detection system 40 is a system dictated by a set of standards in vehicles 1. The presence detection system 40 allows the presence of a child 2B forgotten in the vehicle 1 to be detected in order to notify the user 2A and to implement a set of solutions to prevent the extended presence of the child 2B in the vehicle 1 from having harmful effects on their health.

The presence detection system 40 can thus trigger an alarm in the vehicle 1, send a message to the communication device 2A-1 of the user 2A, or even activate certain functions of the vehicle 1, such as the air conditioning or opening the windows, for example.

Child Monitoring System 50

As shown in FIG. 1, the child monitoring system 50 comprises an electronic control unit 510 and a motion detection module 520.

The child monitoring system 50 is activated by the user 2A in order to voluntarily deactivate the presence detection system 40 and to be able to leave a child 2B asleep in the stationary vehicle 1 while being able to exit the vehicle 1.

In one operating mode, the activation of the child monitoring system 50 is proposed to the user 2A when the vehicle 1 is switched to standby and when the presence detection system 40 detects the presence of a child 2B in the vehicle 1. The user 2A then has a choice between activating the child monitoring system 50, notably if the child is asleep and the user 2A wishes to leave the child in the vehicle 1 for a while, or even not activating it, for example, if the user 2A intends to take the child 2B directly out of the vehicle 1.

In another operating mode, the child monitoring system 50 can be activated directly by the user 2A via the user interface 30 of the vehicle 1 when the user 2A so wishes.

The electronic control unit 510 is configured to receive an activation signal when the user 2A activates the child monitoring system 50 and to send a signal for deactivating the presence detection system 40 upon receipt of said activation signal.

The electronic control unit 510 is configured to exchange signals with the motion detection module 520 via the communication network 20.

The electronic control unit 510 is configured to analyze a motion detection signal sent by the motion detection module 520 in order to determine whether the detected motion indicates that the child 2B is awake.

In one embodiment, the electronic control unit 510 includes artificial intelligence and machine-learning functions for determining whether the detected movement indicates that the child 2B is awake.

The electronic control unit 510 is configured to activate at least one timer that expires at the end of a predetermined duration.

The electronic control unit 510 is configured to send a warning message to the communication device 2A-1 of the user 2A via the communication network 20, the antenna module 10 and the wireless communication link.

The electronic control unit 510 is configured to send a reactivation signal to the presence detection system 40 via the communication network 20.

The electronic control unit 510 is configured to detect the return of the user 2A to the vehicle 1, notably by detecting the opening of one of the doors of the vehicle 1 or, additionally or alternatively, by detecting the unlocking of the vehicle 1.

The electronic control unit 510 also can be configured to exchange with an intrusion detection system of the vehicle 1 in order to prevent the intrusion detection system from considering the child 2B left in the vehicle 1 to be an intruder.

Motion Detection Module 520

The motion detection module 520 is configured to detect a movement in the passenger compartment of the vehicle 1 when the child monitoring system 50 is activated.

In a preferred operating mode, the motion detection module 520 is configured to receive reference signals corresponding to the state of the portion of the vehicle 1 where the child 2B is located upon receipt of the activation signal sent by the electronic control unit 510, to receive signals periodically and to compare these signals with the reference signals in order to determine whether there has been a movement.

In a preferred embodiment, the motion detection module 520 comprises at least one radio frequency wave transceiver. The signals received by the motion detection module 520 are then the reflections of radio frequency signals transmitted by the motion detection module 520.

In this embodiment, the radio frequency waves can be, for example, of the RADAR type or of the UWB type.

In addition or alternatively, the motion detection module 520 can comprise at least one camera and can determine the movement of the child 2B on received images.

Additionally or alternatively, the motion detection module 520 can comprise microphone devices that determine noises made by the child 2B.

When a movement has been detected, the motion detection module 520 is configured to send a motion detection signal to the electronic control unit 510.

User 2A

The user 2A drives the vehicle 1, has placed a child 2B in the vehicle 1 and has a communication device 2A-1.

Child 2B

The child 2B may have fallen asleep while traveling in the vehicle 1. In this case, when the vehicle stops, the user 2A may decide to leave the child 2B asleep in the vehicle 1.

Communication Device 2A-1

The communication device 2A-1 is a portable device that the user 2A keeps on their person, and which communicates with the systems of the vehicle 1 via the wireless communication link and the antenna module 10.

Preferably, the communication device 2A-1 is a smartphone-type mobile telephone installed with an application specific to monitoring a child 2B left in the vehicle 1.

In another embodiment, the communication device 2A-1 can be a separate device specifically configured for monitoring a child 2B left in the vehicle 1.

Example of Operation

The method according to an aspect of the invention is implemented when, at the end of a journey, a child 2B has fallen asleep in the vehicle 1.

In a first step E1, the user 2A places the vehicle 1 on standby, for example, by turning a key. In a manner known per se, the presence detection system 40 activates and detects the sleeping child 2B.

In a second step E2, the presence detection system 40 triggers the proposal to the user 2A to activate the child monitoring system 50, on a user interface 30 of the vehicle 1.

In a third step E3, the user 2A chooses whether or not to activate the child monitoring system 50.

If the user 2A wishes to remove the sleeping child 2B from the vehicle 1, the user 2A refuses activation and removes the child 2B from the vehicle 1. The child monitoring system 50 then is not activated, and the presence detection system 40 deactivates since it no longer detects a child 2B on board the vehicle 1.

In the event that the user 2A wishes to leave the child 2B asleep in the vehicle 1, the user 2A triggers the activation of the child monitoring system 50 and exits the vehicle 1.

In another operating mode, the user 2A can access the activation of the child monitoring system 50 on the user interface 30 themselves whenever they wish.

In the event that the user 2A chooses to activate the child monitoring system 50 on the user interface, the electronic control unit 510 receives the activation signal via the communication network 20 in a step E4. The child monitoring system 50 is then activated.

Upon activation, the child monitoring system 50 triggers a first timer that expires at the end of a first predetermined duration.

In a step E5, the electronic control unit 510 sends the presence detection system 40 a deactivation signal via the communication network 20. The presence detection system 40 is then deactivated.

In a step E6, the electronic control unit 510 sends the motion detection module 520 an initialization signal via the communication network 20.

Steps E5 and E6 can be carried out at the same time.

In a step E7, the motion detection module 520 triggers the motion detection.

Firstly, the motion detection module 520 sends a first radio frequency signal and receives the reflection of this signal on the portion of the interior of the vehicle 1 where the child 2B is located. This first reception allows a basic state to be determined in which the child 2B is still asleep.

Secondly, the motion detection module 520 periodically sends radio frequency signals and receives the reflections of these signals.

Each time a signal is received, the motion detection module 520 compares the received signals with those of the basic state. A difference between these two signals can indicate a movement of the child 2B, and therefore that the child may be awake.

If the child 2B moves, the motion detection module 520 detects a movement in a step E8 and sends a motion detection signal to the electronic control unit 510.

In a step E9, the electronic control unit 510 analyzes this signal in order to confirm that the child 2B is indeed awake.

This confirmation step requires prior training, or the use of machine-learning techniques, in order to correspond to the sleeping habits of the child 2B as closely as possible.

If the waking up of the child 2B is not confirmed, the motion detection module 520 continues the periodic transmissions.

If the waking up of the child 2B is confirmed, the electronic control unit 510 triggers, in a step E10, a second timer expiring at the end of a second predetermined duration and sends a warning message to the communication device 2A-1 of the user 2A.

In this step, the electronic control unit 510 generates the message, sends it to the antenna module 10 via the communication network 20, the antenna module 10 sends the message to the communication device 2A-1 over the wireless communication link and the user 2A sees the warning message on their communication device 2A-1, warning them that the child 2B is awake.

As long as the second timer has not reached the second predetermined duration, the electronic control unit 510 can implement certain functions of the vehicle 1 such as, for example, the passenger compartment lighting, the car radio or screens, to accompany the child 2B while awaiting the return of the user 2A. The child 2B can thus listen to music in order to have an audiovisual link with the user 2A.

If the user 2A returns to the vehicle 1 and removes the child 2B before the second timer expires, the child monitoring system 50 detects the opening of a door and/or the unlocking of the vehicle 1 in a step E11 and deactivates itself.

If the user 2A does not return to the vehicle 1 before the second timer expires, the electronic control unit 510 sends a reactivation signal to the presence detection system 40 in a step E11*.

In a step E12*, the presence detection system 40 is reactivated and detects the presence of the child 2B, and activates its functionalities after a certain time period, for example, by activating an alarm, triggering the air conditioning or even opening the windows according to the programming.

If, when the first timer, which was triggered when the child monitoring system 50 was activated, expires before the electronic control unit 510 confirms that the child 2B has woken up, the electronic control unit 510 sends a reactivation signal to the presence detection system 40 in a step E8**.

In a step E9, the presence detection system 40 is reactivated and detects the presence of the child 2**B, and activates its functionalities after a certain time period, for example, by activating an alarm, triggering the air conditioning or even opening the windows according to the programming.

As a variant or additionally, the method can also comprise a step of measuring the distance between the vehicle 1 and the device 2A-1, a step of comparing the measured distance with a predefined distance corresponding to a dedicated monitoring area and a step of sending a message to the device 2A-1 if said device leaves the dedicated monitoring area, i.e., when the measured distance is greater than the predetermined distance.

This dedicated monitoring area ensures that the user 2A does not stray too far from the vehicle 1 while a child 2B is inside.

The invention claimed is:

1. A method for monitoring a child present in a passenger compartment of a motor vehicle, said vehicle comprising:
- a vehicle antenna module,
- a vehicle communication network,
- a vehicle based presence detection system, and
- vehicle based a child monitoring system,
- said vehicle antenna module configured to communicate with a communication device of a user of the vehicle over a wireless communication link,
- said child monitoring system comprising a vehicle based electronic control unit and a vehicle based motion detection module configured to detect a movement of the child, said electronic control unit configured to communicate with the vehicle based motion detection module, the vehicle antenna module and vehicle based the presence detection system via said communication network, said method comprising:

placing the vehicle on standby;

the vehicle based presence detection system detecting a child in the vehicle after the vehicle has been placed on standby;

the user deactivating the vehicle based presence detection system via the vehicle based electronic control unit;

the vehicle based electronic control unit activating, following the deactivation of the vehicle based presence detection system, the vehicle based motion detection module and a first timer expiring at an end of a first predetermined duration;

the vehicle based electronic control unit sending a warning message if the vehicle based motion detection module detects a movement of the child, with said warning message being sent via the vehicle antenna module to the communication device of the user, activating a second timer expiring at an end of a second predetermined duration and reactivating the vehicle based presence detection system when said second timer has expired or deactivating the vehicle based motion detection module when the user returns to the vehicle;

reactivating the vehicle based presence detection system when said first timer has expired if no movement of the child is detected by the vehicle based motion detection module during the first predetermined duration.

2. The method as claimed in claim 1, said method comprising, before the step of deactivating the vehicle based presence detection system, a step of activating the vehicle based monitoring system that is carried out on a command of the user.

3. The method as claimed in claim 1, said method comprising an intermediate step of the vehicle based electronic control unit confirming the waking of the child after detecting a movement of the child, and the step of sending a warning message is only triggered if the child whose movement has been detected is confirmed as being awake.

4. The method as claimed in claim 1, wherein the return of the user corresponds to an opening of a door of the vehicle.

5. The method as claimed in claim 2, said method comprising an intermediate step of the vehicle based electronic control unit confirming the waking of the child after detecting a movement of the child, and the step of sending a warning message is only triggered if the child whose movement has been detected is confirmed as being awake.

6. An electronic control unit of a motor vehicle, said vehicle comprising:

a vehicle based presence detection system;

a vehicle communication network;

a vehicle antenna module; and a vehicle motion detection module, said vehicle electronic control unit comprising a memory zone and configured to communicate via the vehicle communication network, said vehicle electronic control unit also configured to:

deactivate the vehicle based presence detection system on a command of the user following detection of the presence of a child in the vehicle, by the vehicle presence detection system, when the vehicle is in a standby mode;

activate the vehicle motion detection module and a first timer expiring at an end of a first predetermined duration following the deactivation of the vehicle presence detection system;

send a warning message, after the vehicle motion detection module detects a movement of the child, to a communication device of a user via the vehicle antenna module, activate a second timer expiring at an end of a second predetermined duration and reactivate the vehicle presence detection system when said second timer has expired or deactivate the motion detection module when the user returns to the vehicle;

reactivate the vehicle presence detection system when said first timer has expired if no movement of the child is detected by the vehicle motion detection module during the first predetermined duration.

7. The vehicle electronic control unit as claimed in claim 6, said vehicle electronic control unit also being configured to receive a signal for activating the vehicle based presence detection system from a user interface of the vehicle via the vehicle communication network.

8. The vehicle electronic control unit as claimed in claim 6, said vehicle electronic control unit also being configured to confirm that the child whose movements are detected by the vehicle motion detection module is awake.

9. The vehicle electronic control unit as claimed in claim 6, said vehicle electronic control unit also being configured to detect an opening of a door of the vehicle and to interpret said opening of the door as a return of a user to the vehicle.

10. A child monitoring system for a vehicle, comprising an electronic control unit as claimed in claim 6, a vehicle communication network and a vehicle motion detection module.

11. The vehicle electronic control unit as claimed in claim 6, the vehicle motion detection module adapted to send a first radio frequency signal to a portion of an interior of the vehicle where the child is located and to receive a reflection of sent signal.

12. The electronic control unit as claimed in claim 7, said vehicle electronic control unit also being configured to confirm that the child whose movements are detected by the motion detection module is awake.

13. A vehicle comprising a child monitoring system as claimed in claim 10, a presence detection system, an antenna module configured to communicate with a communication device of a user of the vehicle over a communication link and a vehicle communication network.

14. The vehicle as claimed in claim 13, wherein communication network is a wired communication network of the vehicle.

15. The vehicle electronic control unit as claimed in claim 11, wherein each time a refection signal is received, the vehicle motion detection module compares the received signal with that of a predetermined state, and wherein a difference between the compared signals indicates a movement of the child, and therefore that the child may be awake.

* * * * *